United States Patent [19]

Shimizu et al.

[11] Patent Number: 5,142,011

[45] Date of Patent: Aug. 25, 1992

[54] FLUORINE-CONTAINING COPOLYMER AND CURABLE COMPOSITION CONTAINING THE SAME

[75] Inventors: Yoshiki Shimizu; Haruhiko Mohri; Susumu Wada; Hideya Saito, all of Settsu, Japan

[73] Assignee: Daikin Industries, Ltd., Osaka, Japan

[21] Appl. No.: 783,965

[22] Filed: Oct. 29, 1991

[30] Foreign Application Priority Data

Oct. 29, 1990 [JP] Japan .................. 2-293245
Jan. 7, 1991 [JP] Japan ...................... 3-263

[51] Int. Cl.$^5$ ........................... C08F 214/18
[52] U.S. Cl. ............................. 526/249; 526/250; 526/253; 526/254; 526/255
[58] Field of Search ............ 526/250, 247, 255, 249, 526/253, 254

[56] References Cited

U.S. PATENT DOCUMENTS

| | | | |
|---|---|---|---|
| 4,345,057 | 8/1982 | Yamabe et al. | 526/247 |
| 4,640,966 | 2/1987 | Mitani et al. | 526/247 |
| 4,690,968 | 9/1987 | Mitani et al. | 524/315 |

FOREIGN PATENT DOCUMENTS

| | | | |
|---|---|---|---|
| 59-102962 | 6/1984 | Japan . | |
| 61-87764 | 5/1986 | Japan | 526/247 |
| 2081727 | 2/1982 | United Kingdom | 526/255 |

*Primary Examiner*—Joseph L. Schofer
*Assistant Examiner*—N. Sarofim
*Attorney, Agent, or Firm*—Armstrong & Kubovcik

[57] ABSTRACT

A fluorine-containing copolymer comprising: 30 to 85% by mole of structural units (a):

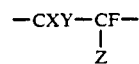

1 to 30% by mole of structural units (b):

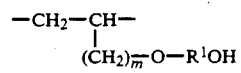

and 3 to 60% by mole of structural units (c):

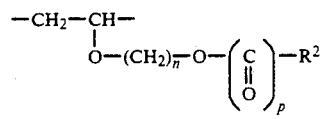

and a curable composition containing the same. The copolymer is excellent in compatibility with curing agents and the obtained film therefrom is excellent in appearance, gloss, durability, and the like.

3 Claims, No Drawings

FLUORINE-CONTAINING COPOLYMER AND CURABLE COMPOSITION CONTAINING THE SAME

BACKGROUND OF THE INVENTION

The present invention relates to a fluorine-containing copolymer and a curable composition containing the same, and more particularly to a fluorine-containing copolymer which is suitable for use in coatings, sealants, films, and the like, and a curable composition containing the copolymer as a main component.

In a field of a fluorine-containing resin coating curable at room temperature, a coating composition containing a polymer comprising as main components a vinyl ester of carboxylic acid having about 10 carbon atoms and a fluoroolefin has been known (Japanese Unexamined Patent Publication No. 61-275311). However, since the fluorine-containing copolymer has a structure wherein an ester group bonds to the polymer main chain, there is a case that the copolymer is easily deteriorated by light. Accordingly, though the coating film thereof is excellent in gloss and water repellency just after coating, they become immediately poor due to the insufficent weatherability of the copolymer. Thus, it is impossible to keep the film appearance excellent for a long period of time.

Also, in the field of the fluorine-containing copolymer, a fluorine-containing copolymer used for a coating which contains a polymer comprising as main components a vinyl ester of carboxylic acid having about 10 carbon atoms and a fluoroolefin and is not required to bake at a high temperature has hitherto been known (Japanese Unexamined Patent Publication No. 59-102962). The coating is used for protecting a base material and for improving the weatherability of the base material. However, since the fluorine-containing copolymer has a structure wherein an ester group bonds to the polymer main chain, the copolymer is easily deteriorated by light. Accordingly, though the coating film thereof is excellent in gloss and water repellency just after coating, they become immediately poor due to the insufficent weatherability of the copolymer. Thus, it is impossible to keep the film surface excellent for a long period of time.

On the other hand, an alternating copolymer of chlorotrifluoroethylene or tetrafluoroethylene, and vinyl ethers wherein one kind of the vinyl ethers has a cross-linkable functional group is excellent in weatherability and is curable at room temperature. Accordingly, it has been proposed to use the alternating copolymer in fluorine-containing resin coatings (Japanese Examined Patent Publication No. 60-21686). The coating containing the alternating fluorine-containing copolymer is, however, inferior in appearance, gloss, solubility, compatibility, hardness, and the like to other widely used coatings. Also, though the alternating copolymer is superior in weatherability and chemical resistance to the fluorine-containing copolymer prepared using the vinyl ethers, as mentioned above, the compatibility with curing agents and the pigment dispersibility are poor. Accordingly, the alternating copolymer cannot be widely used as the coating.

An object of the present invention is to provide a fluorine-containing copolymer which is excellent in solvent solubility and compatibility with curing agents, and which can provide a coating film having excellent appearance, gloss and weatherability, the gloss and the weatherability being able to keep excellent for a long period of time.

A further object of the present invention is to provide a curable composition containing the above-mentioned fluorine-containing copolymer as a main component.

These and other objects of the present invention will become apparent from the description hereinafter.

SUMMARY OF THE INVENTION

In accordance with the present invention, there is provided a fluorine-containing copolymer comprising:
30 to 85% by mole of structure units having the formula (a):

wherein X and Y are the same or different and each is a hydrogen atom or a fluorine atom, and Z is a hydrogen atom, a fluorine atom, a chlorine atom or a trifluoromethyl group,
1 to 30% by mole of structure units having the formula (b):

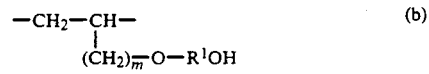

wherein $R^1$ is a linear or branched alkylene group having 1 to 10 carbon atoms and m is 0 or 1, and
3 to 60% by mole of structure units having the formula (c):

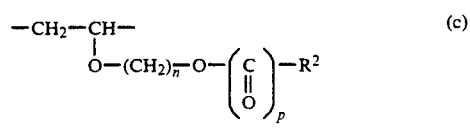

wherein $R^2$ is a linear or branched aliphatic alkyl group having 1 to 10 carbon atoms or an aromatic group, n is an integer of 2 to 8 and p is 0 or 1. The copolymer may contain up to 50% by mole of other monomers copolymerizable therewith, as occasion demands.

Also, in accordance with the present invention, there is provided a curable composition comprising the above-mentioned fluorine-containing copolymer and a curing agent.

DETAILED DESCRIPTION

The fluorine-containing copolymer of the present invention comprises the structural units (a), (b) and (c) as essential components.

The copolymer contains the structure units having the formula (a):

wherein X and Y are the same or different and each is a hydrogen atom or a fluorine atom, and Z is a hydrogen atom, a fluorine atom or a trifluoromethyl group in a content of 30 to 85% by mole. A preferable range is, in case that the both X and Y in the formula (a) are hydrogen atoms, from 60 to 85% by mole and in other cases than the above-mentioned, from 40 to 60% by mole.

When the content of the structural units (a) is within the above-mentioned range, the obtained coating film from the copolymer is excellent in weatherability. When the content of the units (a) is more than 85% by mole, the solvent solubility of the obtained copolymer is poor, and the gloss of the coating film thereof is insufficient. On the other hand, when the content of units (a) is less than 30% by mole, the weatherability, the chemical resistance, corrosion resistance and stain resistance are poor.

The copolymer contains the structural units having the formula (b):

wherein $R^1$ is a linear or branched alkylene group having 1 to 10, preferably from 2 to 10 carbon atoms and m is 0 or 1 in a content of 1 to 30% by mole, preferably from 4 to 20% by mole. When the structural units (b) give the curability to the fluorine-containing copolymer. The content of the structural units (b) is more than 30% by mole, the copolymer is easily crosslinked, thus resulting in poor storage stability. On the other hand, when the content of the structural units (b) is less than 1% by mole, the curability is poor.

The copolymer contains the structural units having the formula (c):

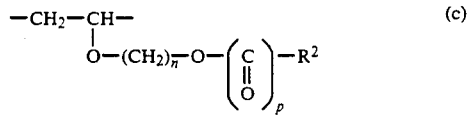

in a content of 3 to 60% by mole, preferably from 5 to 45% by mole. The copolymer containing 3 to 60% by mole of the structural units (c) is excellent in compatibility with a curing agent reactive with the structural units (b) and solubility in the solvent. That is, thus copolymer has excellent solubility in an ester solvent such as ethyl acetate, butyl acetate, isobutyl acetate or acetic acid cellosolve, or a ketone solvent such as acetone, methyl ethyl ketone or methyl isopropyl ketone. Further, it is possible to use an aromatic hydrocarbon solvent such as toluene or xylene which is used for diluting the above-mentioned solvents.

When the content of the structure units (c) is more than 60% by mole, the weatherability, the chemical resistance, corrosion resistance and stain resistance are poor. On the other hand, when the content of the structure units (c) is less than 3% by mole, the compatibility with the curing agent is poor and the number of the solvents which can be used is small.

Each of the units (a), the units (b) and the units (c) may contain alone or as a mixture thereof.

The fluorine-containing copolymer of the present invention has a number average molecular weight of 1,000 to 200,000, preferably from 3,000 to 100,000, measured by gel permeation chromatograph (GPC) and a glass transition temperature of $-40°$ to $70°$ C., preferably from $0°$ to $70°$ C.

Examples of the monomers from which the structural units (a) are obtained are, for instance, vinyl fluoride, vinylidene fluoride, 1-chloro-1-fluoroethylene, trifluoroethylene, tetrafluoroethylene, chlorotrifluoroethylene, hexafluoropropylene, and the like. They may be used alone or as a mixture thereof.

Examples of the monomers from which the structure units (b) are obtained are, for instance, 2-hydroxyethyl vinyl ether, 3-hydroxypropyl vinyl ether, 2-hydroxylpropyl vinyl ether, 2-hydroxy-2-methylpropyl vinyl ether, 4-hydroxybutyl vinyl ether, 4-hydroxy-2-methylbutyl vinyl ether, 5-hydroxypentyl vinyl ether, 6-hydroxyhexyl vinyl ether, 2-hydroxyethyl allyl ether, and the like. They may be used alone or as a mixture thereof.

The group $R^2$ in the formula (c) is a linear or branched aliphatic alkyl group having 1 to 10, preferably from 1 to 8, carbon atoms such as methyl, ethyl, n-propyl, isopropyl, n-butyl, isobutyl, tert-butyl, cyclohexyl or cyclooctyl; or an aromatic hydrocarbon group having 6 to 20, preferably from 6 to 14, carbon atoms such as phenyl group, tolyl group, tert-butylphenyl group, naphthyl group, anthryl group, methoxyphenyl group, chlorophenyl group, nitrophenyl group or cyanophenyl group. Also, the integer n is an integer of 2 to 8, preferably from 2 to 6, from the viewpoint of the hardness of the coating film. Corresponding monomers to the structure unit of the formula (c) wherein n is 1 are too unstable to use.

Examples of the monomers from which the structural units (c) are obtained are, for instance, 2-acetoxyethyl vinyl ether, 4-acetoxybutyl vinyl ether, 2-vinyloxyethyl propionate, 3-vinyloxypropyl n-butyrate, 2-vinyloxyethyl pivalate, 4-vinyloxybutyl cyclohexane carboxylic acid, 2-vinyloxyethyl benzoate, 2-vinyloxyethyl tert-butylbenzoate, 2-vinyloxyethyl naphthoate, 4-vinyloxybutyl benzoate, 2-phenoxyethyl vinyl ether, 2-(cyanophenoxy)ethyl vinyl ether, 4-(tert-butylphenoxy)-butyl vinyl ether, 2-(naphthoxy)ethyl vinyl ether, 4-(anthryloxy)butyl vinyl ether, and the like. They may be used alone or as a mixture thereof.

In order to give physical properties other than the above-mentioned to the fluorine-containing copolymer, other monomers polymerizable therewith can be contained in the copolymer in such an amount that the effects obtained from the structure units (a), (b) and (c) are not impaired within the range of not more than 50% by mole, as occasion demands.

Examples of the other monomers are, for instance, an alkyl vinyl ether such as methyl vinyl ether, ethyl vinyl ether, n-propyl vinyl ether, isobutyl vinyl ether, tert-butyl vinyl ether, n-pentyl vinyl ether, n-hexyl vinyl ether, n-octyl vinyl ether, 2-ethylhexyl vinyl ether or chloromethyl vinyl ether; a cycloalkyl vinyl ether such as cyclopentyl vinyl ether, cyclohexyl vinyl ether, methyl cyclohexyl vinyl ether or cyclooctyl vinyl ether; a fluoralkyl vinyl ether such as 2,2,2-trifluoroethyl vinyl ether, 2,2,3,3-tetrafluoropropyl vinyl ether, 2,2,3,3,3-pentafluoropropyl vinyl ether, 2,2,3,3,4,4,5,5-octafluoropentyl vinyl ether, 2,2,3,3,4,4,5,5,6,6,7,7,8,8,9,9-hexadecafluorononyl vinyl ether, perfluoromethyl vinyl ether, perfluoroethyl vinyl ether or perfluoropropyl vinyl ether; a fluoroalkyl ethylene such as perfluorohexyl ethylene or perfluoropentyl ethylene; a vinyl ester of carboxylic acid such as vinyl acetate, vinyl propionate, vinyl butyrate, vinyl isobutyrate, vinyl pivalate, vinyl caproate, vinyl versatate, vinyl laurate, vinyl stearate, vinyl benzoate, vinyl p-tert-butylbenzoate, vinyl salicylate or vinyl cyclohexanecarboxylate; an olefin such as ethylene, propylene, isobutylene, 1-heptene, vinyl chloride, vinylidene chloride, allyl chloride or allyl acetate; unsaturated carboxylic acid or its anhydrate such as acrylic acid, methacrylic acid, maleic anhydride, fumaric acid, maleic acid, crotonic acid or cinnamic acid and its ester; acrylonitrile; styrene; vinyl ether containing an aromatic group such as benzyl vinyl ether, phenetil vinyl ether or phenyl vinyl ether, and the like. They may be used alone or as a mixture thereof.

The copolymer of the present invention is generally prepared in emulsion polymerization method, suspension polymerization method, solution polymerization method, or the like at a temperature of generally from 0° to 150° C., preferably from 5° to 95° C. under a pressure of, generally from 1 to 100 kg/cm²G.

As the polymerization medium, water is used in emulsion polymerization. In suspension polymerization, there are used, for instance, water, tert-butanol, 1,1,2-trichloro-1,2,2-trifluoroethane, 1,2-dichloro-1,1,2,2-tetrafluoroethane, a mixture thereof and the like. In solution polymerization, there are used, for instance, an ester such as methyl acetate, ethyl acetate, propyl acetate or butyl acetate, a ketone such as acetone, methyl ethyl ketone or cyclohexanone, a hydrocarbon such as hexane, cyclohexane or octane, an aromatic hydrocarbon such as benzene, toluene, xylene or naphthalene, an alcohol such as methanol, ethanol, tert-butanol, isopropanol or ethyleneglycol monoalkyl ether, a cyclic ether such as tetrahydrofuran, tetrahydropyran or dioxane, dimethyl sulfoxide, a mixture thereof, and the like.

As a polymerization initiator, in emulsion polymerization, there are used, for instance, a persulfate such as ammonium persulfate or potassium persulfate (if necessary, a reducing agent such as sodium hydrogensulfite, sodium pyrosulfite, cobalt naphthenate or dimethylaniline is used together with the persulfate); a redox initiator comprising an oxidizing agent such as ammonium peroxide or potassium peroxide, a reducing agent such as sodium persulfate and a transion metal salt such as iron sulfate, and the like. Also, in suspension polymerization or solution polymerization, there are used, for instance, an organic peroxide such as acetyl peroxide, benzoyl peroxide, isopropoxycarbonyl peroxide, tert-butoxycarbonyl peroxide, methyl ethyl ketone peroxide, cyclohexanone peroxide, tert-butyl hydroperoxide, cumene hydroperoxide, isobutyryl peroxide, octanoyl peroxide, di-tert-butyl peroxide, dicumyl peroxide, tert-butyl peroxyacetate, tert-butyl peroxypivalate, di-n-propyl peroxydicarbonate or diisopropyl peroxydicarbonate; an azo compound such as 2,2'-azobisisobutyronitrile, 2,2'-azobis (2,4-dimethyl valeronitrile), 2,2'-azobis(2-methylvaleronitrile), 2,2'-azobis(2-cyclopropylpropionitrile), dimethyl 2,2'-azobisisobutyrate, 2,2'-azobis[2-(hydroxymethyl)]propionate or 4,4'-azobis(4-cyanopentenoic acid); and the like.

According to any polymerization methods, there is a case where hydrogen fluoride or hydrogen chloride is eliminated from the monomers and the polymers during polymerization to acidify the polymerization medium, thus resulting in causing the gelation of the prepared copolymer. Accordingly, to the polymerization system might be added an inorganic salt such as sodium hydrogencarbonate, sodium carbonate, potassium hydrogencarbonate, potassium carbonate, sodium phosphate, a metal oxide or a hydrotalcite; an organic amine such as diethyl amine, dibutyl amine or triethyl amine; or a basic anion exchange resin to neutralize the eliminated hydrogen fluoride or hydrogen chloride.

The copolymer of the present invention is solved in a solvent as it is and is used as a lacquer coating. Also, it is used as a two-component curable composition, by admixing with a curing agent.

The copolymer of the present invention is greatly relaxed restrictions on solvents to be used or using conditions. Accordingly, as the solvents which can be used, there are exemplified, for instance, an ester such as ethyl acetate, butyl acetate, isopropyl acetate, isobutyl acetate, or acetic acid cellosolve; a ketone such as acetone, methyl ethyl ketone, methyl isobutyl ketone or cyclohexanone; a cyclic ether such as tetrahydrofuran or dioxane; an amide such as N,N-dimethylformamide or N,N-dimethylacetoamide, an aromatic hydrocarbon such as toluene or xylene; a mixture thereof, and the like.

The concentration of the copolymer is from 5 to 90% by weight, preferably from 10 to 70% by weight.

The curable composition of the present invention contains a curing agent. As the curing agent, there are used a compound having two or more groups reactive with hydroxyl group of the copolymer to crosslinke. There are usually used, for instance, isocyanates, amino resins, acid anhydrides, epoxy resins, silicic acids, ladder silicons, and the like.

Examples of the isocyanates are, for instance, 2,4-tolylenediisocyanate, diphenyl methane-4,4'-diisocyanate, xylylenediisocyanate, isophoronediisocyanate, lysine methyl ester diisocyanate, methyl cyclohexyl diisocyanate, trimethyl hexamethylene diisocyanate, hexamethylene diisocyanate, n-pentane-1,4-diisocyanate, a trimer thereof, an adact thereof, a buret thereof, a polymer thereof containing two or more isocyanate groups, a blocked isocyanate, and the like. The isocyanates are not limited thereto.

Examples of the amino resins are, for instance, an urea resin, a melamine resin, a benzoguanamine resin, a glycolylurea resin, a methylolmelamine obtained by methylolating melamine, an alkyl etherificated melamine resin obtained by subjecting to etherification of methylolmelamine with an alcohol such as methanol, ethanol or butanol, and the like. The amino resins are not limited thereto.

Examples of the acid anhydrides are, for instance, phthalic anhydride, pyromellitic anhydride, mellitic anhydride, and the like. The acid anhydrides are not limited thereto.

The amount of the curing agent is from 0.1 to 5 equivalents per equivalent of the functional group (—OH) of the fluorine-containing copolymer, preferably from 0.5 to 1.5 equivalents. The curable composition can be cured at 0° to 200° C. for several minutes to about 10 days.

Various additives can be added to the curable composition of the present invention. Examples of the additives are, for instance, a curing accelerator, a pigment, dispersant for pigment, a leveling agent, an antifoaming agent, an antigelling agent, an ultraviolet stabilizer, an antioxidant, and the like.

Examples of the accelerators are, for instance, an organotin compound such as dibutyl tin dilaurate, acid phosphate, a reaction product of acid phosphate with amine, a saturated or unsaturated polyvalent carboxylic acid or its anhydride, an organic titanate compound, an amine compound, lead octylate, and the like. The accelerators are not limited thereto. The accelerator may be used alone or as a mixture thereof. It is preferable that the amount of the accelerator is from $1.0 \times 10^{-6}$ to $1.0 \times 10^{-2}$ part by weight based on 100 parts by weight of the copolymer, more preferably from $5.0 \times 10^{-5}$ to $1.0 \times 10^{-3}$ part by weight.

Examples of the pigments are, for instance, an inorganic pigment such as titanium oxide, calcium carbonate or carbon black, an organic pigment such as a phthalocyanine pigment, a quinacridone pigment or an azo pigment, and the like. The pigments are not limited thereto. The pigment is generally used in an amount up to about 200% by weight of the copolymer.

Further, the curable composition of the present invention may contain other resins. Examples of the other resins are, for instance, acrylic or methacrylic resins which may be contain styrene, polyester resins, alkyd resins, melamine-formaldehyde resins, polyisocyanate resins, epoxy resins, vinyl chloride resins such as vinyl chloride-vinyl acetate copolymer, ketone resins, petroleum resins, chlorinated polyolefins such as chlorinated polyethylene or polypropylene, inorganic resins such as silica gel and silicic acid, various fluorine-containing resin other than the fluorine-containing copolymer of the present invention such as homopolymer of tetrafluoroethylene or chlorotrifluoroethylene, copolymer of tetrafluoroethylene or chlorotrifluoroethylene with other monomers. They may be used alone or as a mixture thereof. The resins are not limited thereto.

The composition of the present invention can be obtained by thoroughly admixing the components.

The composition of the present invention is excellent in solvent solubility, and the coating film thereof is excellent in gloss retention, weatherability, stain resistance, chemical resistance, mechanical properties, adhesion to substrates, yellowing resistance, and the like. The curable composition is used as an indoor coating such as a coating for a building material or interial materials, an outdoor coating such as a coating for a building material, automobile, aircraft, ship or train. They can be coated directly on a metal, concrete, plastic, or the like, or coated on a coating film of under coat such as a washing primer, anticorrosive paint, epoxy paint, acrylic paint, polyester paint. Further, the composition can be used as a sealing agent, film-forming material, and the like.

The present invention is more specifically described and explained by means of the following Examples, in which all parts and percent are by weight unless otherwise noted. It is to be understood that the present invention is not limited to the Examples, and various changes and modifications may be made in the invention without departing from the spirit and scope thereof.

EXAMPLE 1

A 3 l stainless steel autoclave equipped with a stirrer was charged with 1000 ml of ethyl acetate and 4.8 g of a mixture of 4-hydroxybutyl vinyl ether (HBVE) and 2-acetoxyethyl vinyl ether (AcOVE) [HBVE:AcOVE=2:1 by mole]. After substituting the space of the autoclave by nitrogen and degassing, 52.8 g of tetrafluoroethylene (TFE) and 400.8 g of vinylidene fluoride (VdF) were added to the autoclave. The inner temperature of the autoclave was elevated, and 2.0 g of diisopropyl peroxydicarbonate (IPP) was added to the autoclave at the time when the temperature reached to 40° C. to start the polymerization reaction. The reaction pressure at the starting point was 18.0 kg/cm²G. Then, the polymerization was continued by adding a mixture of VdF and TFE (88:12, % by mole) and a mixture of HBVE and AcOVE (2:1, molar ratio) to the autoclave in total amounts of 151.2 g and 75.3 g, respectively, at the time when the reaction pressure was lowered, and further adding 7.0 g of IPP to the autoclave. After 15 hours from the first addition of IPP, the autoclave was cooled with water to stop the reaction. After cooling the autoclave to room temperature, non-reacted monomers were purged, and the autoclave was opened. The obtained reaction mixture was poured into n-hexane, and the precipitate was washed and dried to give a copolymer. Yield: 303 g.

The copolymer had a number average molecular weight of 4,800 and a weight average molecular weight of 9,000. The molecular weights were measured by gel permeation chromatography (GPC) (polystyrene standard, developer: THF). Also the copolymer had a thermal decomposition starting temperature (measured at a heating rate of 10° C./minute in air by using a differential thermogravimeter, DTGA method) of 210° C. From the results of $^{19}$F-nuclear magnetic resonance ($^{19}$F-NMR) analysis, $^1$H-NMR analysis and ultimate analysis of the copolymer, it was confirmed that the obtained product was a copolymer of VdF, TFE, AcOVE and HBVE in a molar ratio of 68:10:8:14.

EXAMPLE 2

The procedure of Example 1 was repeated except that 61.2 g of chlorotrifluoroethylene (CTFE) was used instead of TFE to give a copolymer. Yield: 295 g.

As to the obtained copolymer, the number average molecular weight and weight average molecular weight were measured, and $^{19}$F-NMR analysis, $^1$H-NMR analysis and ultimate analysis were conducted in the same manner as in Example 1. That is, the obtained copolymer had a number average molecular weight of 5,500, a weight average molecular weight of 10,000. Also it was confirmed that the copolymer was a copolymer of VdF, CTFE, AcOVE and HBVE in a molar ratio of 68:8:7:17.

EXAMPLE 3

A 1000 ml autoclave equipped with a stirrer was charged with 200 g of butyl acetate, 50 g of xylene, 24 g of HBVE, 42 g of AcOVE and 68 g of vinyl pivalate (PVi). After substituting the space of the autoclave by nitrogen, 107 g of TFE was added to the autoclave. The inner temperature of the autoclave was elevated, and 5.0 g of 2,2'-azobis (2,4-dimethylvaleronitrile) was added to the autoclave at the time when the temperature reached to 50° C. to start the polymerization reaction. The reaction pressure at the starting point was 18.6 kg/cm²G. The polymerization was continued at 52° C. for 25 hours with stirring. The autoclave was cooled with water at the time when the reaction pressure was lowered to 9.6 kg/cm²G to stop the reaction. After cooling the autoclave to room temperature, non-reacted monomers were purged, and the autoclave was opened. The obtained reaction mixture was poured into n-hexane, and the precipitate was washed and dried to give a copolymer. Yield: 189 g.

As to the obtained copolymer, the number average molecular weight, weight average molecular weight and thermal decomposition starting temperature were measured and $^{19}$F-NMR analysis, $^1$H-NMR analysis and ultimate analysis were conducted in the same manner as in Example 1. That is, the copolymer had a number average molecular weight of 15,000, a weight average molecular weight of 39,000 and a thermal decomposition starting temperature of 231° C. Also, it was confirmed that the obtained copolymer was a copolymer of TFE, AcOVE, PVi and HBVE in a molar ratio of 46:13:32:9.

EXAMPLE 4

A 3 l autoclave equipped with a stirrer was charged with 700 g of butyl acetate, 50 g of xylene, 99 g of HBVE, 55 g of AcOVE and 109 g of PVi. After substituting the space of the autoclave by nitrogen, 426 g of TFE and 119 g of isobutylene (IB) were added to the autoclave. The inner temperature of the autoclave was elevated, and 10 g of IPP was added to the autoclave at the time when the temperature reached to 40° C. to start the polymerization reaction. The reaction pressure at the starting point was 17.8 kg/cm$^2$G. The polymerization was continued at 40° C. for 24 hours with stirring. The autoclave was cooled with water at the time when the reaction pressure was lowered to 5.4 kg/cm$^2$G to stop the reaction. After cooling the autoclave to room temperature, non-reacted monomers were purged, and the autoclave was opened. The obtained reaction mixture was poured into n-hexane, and the precipitate was washed and dried to give a copolymer. Yield: 630 g As to the obtained copolymer, the number average molecular weight, weight average molecular weight and thermal decomposition starting temperature were measured and $^{19}$F-NMR analysis, $^1$H-NMR analysis and ultimate analysis were conducted in the same manner as in Example 1. That is, the copolymer had a number average molecular weight of 17,000, a weight average molecular weight of 53,000 and a thermal decomposition starting temperature of 224° C. Also, it was confirmed that the obtained copolymer was a copolymer of TFE, IB, AcOVE, PVi and HBVE in a molar ratio of 43:33:6:10:8.

EXAMPLE 5

The procedure of Example 4 was repeated except that 62 g of ethyl vinyl ether (EVE) was used instead of PVi to give a copolymer. Yield: 637 g As to the obtained copolymer, the number average molecular weight, weight average molecular weight and thermal decomposition starting temperature were measured, and $^{19}$F-NMR analysis, $^1$H-NMR analysis and ultimate analysis were conducted in the same manner as in Example 1. That is, the obtained copolymer had a number average molecular weight of 20,000, a weight average molecular weight of 55,000 and a thermal decomposition starting temperature of 220° C. Also, it was confirmed that the copolymer was a copolymer of TFE, IB, AcOVE, EVE and HBVE in a molar ratio of 45:30:5:11:9.

EXAMPLE 6

The procedure of Example 3 was repeated except that 90 g of trifluoroethylene (TrFE) was used instead of TFE and 48 g of vinyl acetate (VAc) was used instead of PVi to give a copolymer. Yield: 190 g As to the obtained copolymer, the number average molecular weight and weight average molecular weight were measured, and $^{19}$F-NMR analysis, $^1$H-NMR analysis and ultimate analysis were conducted in the same manner as in Example 1. That is, the obtained copolymer had a number average molecular weight of 25,000 and a weight average molecular weight of 65,000. Also, it was confirmed that the copolymer was a copolymer of TrFE, AcOVE, VAc and HBVE in a molar ratio of 49:15:26:10.

EXAMPLE 7

A 1000 ml autoclave equipped with a stirrer was charged with 250 g of acetone, 33 g of HBVE, 37 g of AcOVE and 166 g of vinyl versatate (commercially available under the trademark "Veova 10" from Shell Kagaku Kabushiki Kaisha). After substituting the space of the autoclave by nitrogen, 165 g of CTFE was added to the autoclave. The inner temperature of the autoclave was elevated, and 5.0 g of azobisisobutyronitrile (AIBN) was added to the autoclave at the time when the temperature reached to 65° C. to start the polymerization reaction. The reaction pressure at the starting point was 6.3 kg/cm$^2$G. The polymerization was continued at 65° C. for 16 hours with stirring. The autoclave was cooled with water at the time when the reaction pressure was lowered to 0.4 kg/cm$^2$G to stop the reaction. After cooling the autoclave to room temperature, non-reacted monomers were purged, and the autoclave was opened. The obtained reaction mixture was poured into n-hexane, and the precipitate was washed and dried to give a copolymer. Yield: 345 g As to the obtained copolymer, the number average molecular weight, weight average molecular weight and thermal decomposition starting temperature were measured, and $^{19}$F-NMR analysis, $^1$H-NMR analysis and ultimate analysis were conducted in the same manner as in Example 1. That is, the copolymer had a number average molecular weight of 24,000, a weight average molecular weight of 70,000 and a thermal decomposition starting temperature of 205° C. Also, it was confirmed that the obtained copolymer was a copolymer of CTFE, AcOVE, Veova 10 and HBVE in a molar ratio of 44:14:33:9.

EXAMPLE 8

Test Example

In 10 g of butyl acetate was dissolved 10 g of the each copolymer obtained in Examples 1 to 7, and a curing agent shown in Table 1 was added to the mixture in a molar ratio of hydroxyl group (—OH) in the copolymer to isocyanate group (—NCO) in the curing agent of 0.91 to give a curable composition.

An aluminum plate (AM-712 treatment, commercially available from Nippon Test Panel Co., Ltd.) was coated with the curable composition by brushing, and it was dried and cured at room temperature.

The compatibility of the copolymer with the curing agent and the film properties were measured as follows:

Compatibility with a curing agent

A polyethylene terephtharate film is coated with the each curable composition obtained as above and it is allowed to stand at room temperature. The transparency of the cured film is observed with the naked eye.

Pigment dispersibility

A rutin titanium dioxide powder is admixed with the curable composition in an amount of 50 parts based on 100 parts of solid matter of the composition, to which sodium glass beads with a diameter of 1.5 mm are added in an amount of 100 parts based on 100 parts of the composition and the glass beads, and the mixture is treated in a paint shaker for 4 hours. The dispersion particle size of titanium dioxide is observed with the naked eye according to grindgange provided in JIS K 5400.

Adhesion

According to a cross-cut test (JIS K 5400).

Stain resistance

The whole of a square (10 mm × 10 mm) is marked on the film by using a red marking pen (commercially available under the trademark "Sakura Pen Tach" from Kabushiki Kaisha Sakura Kurepasu), and it is allowed to stand for 24 hours to dry. The ink was rubbed with a tissue paper impregnated with ethanol. Whether the ink remains on the film after rubbing with ethanol or not is observed with the naked eye.

Bending resistance

According to JIS K 5400

Pencil hardness

According to JIS K 5400

Weatherability

The accelerated weathering test is conducted for 4,000 hours by using a sunshine weather-0 meter dew cycle commercially available from Suga Shikenki Kabushiki Kaisha (one cycle: Light/Dew=60 minutes/60 minutes). Contact angles to water are measured prior to conducting the test and after conducting the test by using "CA-A" commercially available from Kyowa Kagaku Kabushiki Kaisha, and the contact angle retention (%) is calculated.

Contact angle retention (%) =

$$\frac{\text{Contact angle after the test}}{\text{Contact angle prior to the test}} \times 100$$

Initial gloss

The film surface is observed with the naked eye.

A rutin titanium dioxide is added to the curable composition, a coating film is prepared and 60'-specular gloss is measured according to JIS K 5400.

Transparency

The film surface was observed with the naked eye.

The results are shown in Table 1.

COMPARATIVE EXAMPLE 1

A 250 ml autoclave equipped with a stirrer was charged with 12.5 g of EVE, 12.5 g of HBVE, 50 g of vinyl 2,2-dimethylhexanoate, 53.8 g of methyl isobutyl ketone, 1.25 g of AIBN, 1.25 g of tert-butylperoxyoctoate and 0.75 g of 1,2,2,6,6-pentamethyl piperidine. After substituting the space of the autoclave by nitrogen and degassing, 37.5 g of TFE and 12.5 g of VdF were added to the autoclave. The inner temperature of the autoclave was elevated to 65° C. and the polymerization reaction was conducted for 15 hours with stirring. The polymerization reaction was stopped and subjected to post-treatment in the same manner as in Example 3 to give a copolymer. Yield: 85 g As to the obtained copolymer, the number average molecular weight and weight average molecular weight were measured, and $^{19}$F-NMR analysis, $^1$H-NMR analysis and ultimate analysis were conducted in the same manner as in Example 1. That is, the copolymer had a number average molecular weight of 5,300 and a weight average molecular weight of 10,500. Also, it was confirmed that the obtained copolymer was a copolymer of VdF, TFE, EVE, vinyl 2,2-dimethyl hexanoate and HBVE in a molar ratio of 5:45:15:25:10.

Using the obtained copolymer, a curable composition was prepared, a coating film was prepared, and the compatibility with curing agent and the film properties were measured in the same manner as in Example 8 wherein as the curing agent TAKENATE D-140N was used. The results are shown in Table 1.

COMPARATIVE EXAMPLE 2

A curable composition was prepared in the same manner as in Example 8, using a copolymer of CTFE, HBVE, cyclohexyl vinyl ether and EVE in a molar ratio of 50:10:15:25 having a number average molecular weight of 18,000 as the fluorine-containing copolymer and using COLONATE EH as the curing agent. Then a coating film was prepared in the same manner as in Example 8. The compatibility with curing agent and film properties were measured in the same manner as in Example 8. The results are shown in Table 1.

TABLE 1

| Ex. No. | Ex. 1 | Ex. 2 | Ex. 3 | Ex. 4 | Ex. 5 |
|---|---|---|---|---|---|
| Curing agent | COLONATE EH*1 | COLONATE EH | TAKENATE*2 D-140N | TAKENATE D-140N | TAKENATE D-140N |
| Compatibility with curing agent | Excellent | Excellent | Excellent | Excellent | Excellent |
| Pigment dispersibility | Excellent | Excellent | Excellent | Excellent | Excellent |
| Adhesion | 100 | 100 | 100 | 100 | 100 |
| Stain resistance | Completely removed | Completely removed | Completely removed | Completely removed | Completely removed |
| Bending resistance | 1T | 1T | 2T | 2T | 2T |
| Pencil hardness | 2H | 1H | 2H | 2H | 2H |
| Weatherability | 95 | 85 | 90 | 95 | 95 |
| Initial gloss | Excellent | Excellent | Excellent | Excellent | Excellent |
| Transparency | Excellent | Excellent | Excellent | Excellent | Excellent |

| Ex. No. | Ex. 6 | Ex. 7 | Com. Ex. 1 | Com. Ex. 2 |
|---|---|---|---|---|
| Curing agent | TAKENATE D-140N | TAKENATE D-140N | TAKENATE D-140N | COLONATE EH D-140N |
| Compatibility with curing agent | Excellent | Excellent | Whiten | Excellent |
| Pigment dispersibility | Excellent | Excellent | Bad | Bad |
| Adhesion | 100 | 100 | 80 | 100 |
| Stain resistance | Completely removed | Completely removed | Remain | Remain |
| Bending resistance | 2T | 2T | 2T | 2T |
| Pencil hardness | 2H | 2H | F | 2H |

TABLE 1-continued

| | | | | |
|---|---|---|---|---|
| Weatherability | 85 | 85 | 50 | 75 |
| Initial gloss | Excellent | Excellent | Bad | Bad |
| Transparency | Excellent | Excellent | Cloudy | Cloudy |

(Notes)
*[1]Hexamethylene diisocyanate trimer commercially available from Nippon Polyurethane Kabushiki Kaisha
*[2]Isophorone diisocyanate.trimethylolpropane trimer commercially available from Takeda Yakuhin Kogyo Kabushiki Kaisha The fluorine-containing copolymer of the present invention can be easily dissolved in various solvents, and its compatibility with the curing agent is excellent. Further, the obtained coating film is excellent in gloss retention.

EXAMPLE 9

A 3 l stainless steel autoclave equipped with a stirrer was charged with 1000 ml of ethyl acetate and 10.5 g of a mixture of HBVE and 2-vinyloxyethyl benzoate (BzOVE) (HBVE:BzOVE=1:2 by mole). After substituting the space of the autoclave by nitrogen and degassing, 51.5 g of TFE and 390.9 g of VdF were added to the autoclave. The inner temperature of the autoclave was elevated, and 2.0 g of IPP was added to the autoclave at the time when the temperature reached to 40° C. to start the polymerization reaction. The reaction pressure at the starting point was 18.5 kg/cm$^2$G. Then, the polymerization was continued by adding a mixture of VdF and TFE (88:12, % by mole) and a mixture of HBVE and BzOVE (1:2, molar ratio) to the autoclave in total amounts of 160.0 g and 145 g, respectively, at the time when the reaction pressure was lowered, and further adding 7.0 g of IPP to the autoclave during polymerization. After 16 hours from the first addition of IPP, the autoclave was cooled with water to stop the reaction. After cooling the autoclave to room temperature, non-reacted monomers were purged, and the autoclave was opened. The obtained reaction mixture was poured into n-hexane, and the precipitate was washed and dried to give a copolymer. Yield: 325 g.

As to the obtained copolymer, the number average molecular weight, weight average molecular weight and thermal decomposition starting temperature were measured, and $^{19}$F-NMR analysis, $^1$H-NMR analysis and ultimate analysis were conducted in the same manner as in Example 1. That is, the obtained copolymer had a number average molecular weight of 5,400, a weight average molecular weight of 10,400 and a thermal decomposition starting temperature of 210° C. Also, it was confirmed that the copolymer was a copolymer of VdF, TFE, BzOVE and HBVE in a molar ratio of 65:10:17:8.

EXAMPLE 10

The procedure of Example 9 was repeated except that 94 g of CTFE was used instead of TFE to give a copolymer. Yield: 314 g.

As to the obtained copolymer, the number average molecular weight and weight average molecular weight were measured, and $^{19}$F-NMR analysis, $^1$H-NMR analysis and ultimate analysis were conducted in the same manner as in Example 1. That is, the obtained copolymer had a number average molecular weight of 6,300, a weight average molecular weight of 14,000. Also, it was confirmed that the copolymer was a copolymer of VdF, CTFE, BzOVE and HBVE in a molar ratio of 69:8:16:7.

EXAMPLE 11

A 1000 ml autoclave equipped with a stirrer was charged with 200 g of butyl acetate, 50 g of xylene, 25 g HBVE, 45 g of 2-phenoxyethylbutyl vinyl ether (PhOVE) and 65 g of PVi. After substituting the space of the autoclave by nitrogen, 130 g of TFE was added to the autoclave. The inner temperature of the autoclave was elevated, and 5.0 g of octanoyl peroxide was added to the autoclave at the time when the temperature reached to 50° C. to start the polymerization reaction. The reaction pressure at the starting point was 25.1 kg/cm$^2$G. The polymerization was continued at 65° C. for 8 hours with stirring. The autoclave was cooled with water at the time when the reaction pressure was lowered to 5.0 kg/cm$^2$G to stop the reaction. After cooling the autoclave to room temperature, non-reacted monomers were purged, and the autoclave was opened. The obtained reaction mixture was poured into n-hexane, the precipitate was washed and dried to give a copolymer. Yield: 155 g As to the obtained copolymer, the number average molecular weight, weight average molecular weight and thermal decomposition starting temperature were measured and $^{19}$F-NMR analysis, $^1$H-NMR analysis and ultimate analysis were conducted in the same manner as in Example 1. That is, the copolymer had a number average molecular weight of 18,000, a weight average molecular weight of 42,000 and a thermal decomposition starting temperature of 231° C. Also, it was confirmed that the obtained copolymer was a copolymer of TFE, PhOVE, PVi and HBVE in a molar ratio of 50:15:27:8.

EXAMPLE 12

A 3 l autoclave equipped with a stirrer was charged with 700 g of butyl acetate, 100 g of HBVE, 175 g of BzOVE and 63 g of PVi. After substituting the space of the autoclave by nitrogen, 450 g of TFE and 124 g of IB were added to the autoclave. The inner temperature of the autoclave was elevated, and 10 g of IPP was added to the autoclave at the time when the temperature reached to 40° C. to start the polymerization. The reaction pressure at the starting point was 19.0 kg/cm$^2$G. The polymerization was continued at 40° C. for 10 hours with stirring. The autoclave was cooled with water at the time when the reaction pressure was lowered to 8.9 kg/cm$^2$G to stop the reaction. After cooling the autoclave to room temperature, non-reacted monomers were purged, and the autoclave was opened. The obtained reaction mixture was poured into n-hexane, and the precipitate was washed and dried to give a copolymer. Yield: 450 g.

As to the obtained copolymer, the number average molecular weight, weight average molecular weight and thermal decomposition starting temperature were measured and $^{19}$F-NMR analysis, $^1$H-NMR analysis and ultimate analysis were conducted in the same manner as in Example 1. That is, the copolymer had a number average molecular weight of 21,000, a weight average molecular weight of 51,000 and a thermal decomposition starting temperature of 224° C. Also, it was confirmed that the obtained copolymer was a copolymer of TFE, IB, BzOVE, PVi and HBVE in a molar ratio of 44:25:16:8:7.

EXAMPLE 13

The procedure of Example 12 was repeated except that 235 g of BzOVE was used and 30 g of EVE was used instead of PVi to give a copolymer. Yield: 480 g.

As to the obtained copolymer, the number average molecular weight, weight average molecular weight and thermal decomposition starting temperature were measured, and $^{19}$F-NMR analysis, $^{1}$H-NMR analysis and ultimate analysis were conducted in the same manner as in Example 1. That is, the obtained copolymer had a number average molecular weight of 18,000, a weight average molecular weight of 41,000 and a thermal decomposition starting temperature of 220° C. Also, it was confirmed that the copolymer was a copolymer of TFE, IB, BzOVE, EVE and HBVE in a molar ratio of 45:26:18:5:6.

EXAMPLE 14

The procedure of Example 11 was repeated except that 101 g of TrFE was used instead of TFE and 38 g of VAc was used instead of PVi to give a copolymer. Yield: 114 g.

As to the obtained copolymer, the number average molecular weight and weight average molecular weight were measured, and $^{19}$F-NMR analysis, $^{1}$H-NMR analysis and ultimate analysis were conducted in the same manner as in Example 1. That is, the obtained copolymer had a number average molecular weight of 23,000 and a weight average molecular weight of 49,000. Also, it was confirmed that the copolymer was a copolymer of TrFE, PhOVE, VAc and HBVE in a molar ratio of 46:20:23:11.

EXAMPLE 15

A 1000 ml autoclave equipped with a stirrer was charged with 250 g of acetone, 35 g of HBVE, 94 g of BzOVE and 102 g of "Veova 10". After substituting the space of the autoclave by nitrogen, 175 g of CTFE was added to the autoclave. The inner temperature of the autoclave was elevated, and 5.0 g of AIBN was added to the autoclave at the time when the temperature reached to 65° C. to start the polymerization reaction. The reaction pressure at the starting point was 7.0 kg/cm$^2$G. The polymerization was continued at 65° C. for 10 hours with stirring. The autoclave was cooled with water at the time when the reaction pressure was lowered to 3.2 kg/cm$^2$G to stop the reaction. After cooling the autoclave to room temperature, non-reacted monomers were purged, and the autoclave was opened. The obtained reaction mixture was poured into n-hexane, and the precipitate was washed and dried to give a copolymer. Yield: 240 g.

As to the obtained copolymer, the number average molecular weight, weight average molecular weight and thermal decomposition starting temperature were measured, and $^{19}$F-NMR analysis, $^{1}$H-NMR analysis and ultimate analysis were conducted in the same manner as in Example 1. That is, the copolymer had a number average molecular weight of 19,000, a weight average molecular weight of 40,000 and a thermal decomposition starting temperature of 205° C. Also, it was confirmed that the obtained copolymer was a copolymer of CTFE, BzOVE, Veova 10 and HBVE in a molar ratio of 45:20:24:11.

EXAMPLE 16

Test Example

In 10 g of butyl acetate was dissolved 10 g of the each copolymer obtained in Examples 9 to 15, and a curing agent shown in Table 2 was mixed with the mixture in a molar ratio of hydroxyl group (—OH) in the copolymer to isocyanate group (—NCO) in the curing agent of 0.91 to give a curable composition.

The same aluminum plate as used in Example 8 was coated with the obtained composition by brushing, and it was dried and cured at room temperature.

The compatibility of the copolymer with the curing agent and the film properties were measured in the same manner as in Example 8.

Film appearance

The coating film obtained in the test of initial gloss is observed with the naked eye.

○: Excellent
Δ: The mean
×: Bad

The results are shown in Table 2.

COMPARATIVE EXAMPLE 3

A 200 ml autoclave equipped with a stirrer was charged with 116 g of tert-butanol, 11.7 g of CHVE, 11.1 g of EVE, 7.17 g of HBVE, 0.69 g of potassium carbonate, and 0.06 g of AIBN. After substituting the space of the autoclave by nitrogen and degussing, 31.0 g of TFE was added to the autoclave. The inner temperature of the autoclave was elevated to 65° C. and the polymerization reaction was conducted for 8 hours with stirring. The polymerization reaction was stopped and subjected to posttreatment in the same manner as in Example 11 to give a copolymer. Yield: 35 g.

As to the obtained copolymer, the number average molecular weight and weight average molecular weight were measured, and $^{19}$F-NMR analysis, $^{1}$H-NMR analysis and ultimate analysis were conducted in the same manner as in Example 1. That is, the copolymer had a number average molecular weight of 36,000 and a weight average molecular weight of 62,000. Also, it was confirmed that the obtained copolymer was a copolymer of TFE, CHVE, EVE and HBVE in a molar ration of 51:17:23:9.

Using the obtained copolymer, a curable composition was prepared and a coating film was prepared in the same manner as in Example 16 wherein as the curing agent COLONATE-EH was used. The compatibility with curing agent and the film properties were measured in the same manner as in Example 16. The results are shown in Table

COMPARATIVE EXAMPLE 4

A curable composition was prepared in the same manner as in Example 16, using a copolymer of CTFE, 2-hydroxyethyl vinyl ether, 2-ethylhexyl vinyl ether and vinyl p-tert-butylbenzoate in a molar ratio of 48:16:15:21 having a number average molecular weight of 22,000 as the fluorine-containing copolymer and using COLONATE-EH as the curing catalyst. Then, a coating film was prepared in the same manner as in Example 16. The compatibility with curing agent and film properties were measured in the same manner as in Example 16. The results are shown in Table 2.

TABLE 2

| Ex. No. | Ex. 9 | Ex. 10 | Ex. 11 | Ex. 12 | Ex. 13 |
| --- | --- | --- | --- | --- | --- |
| Curing agent | COLONATE EH | COLONATE EH | COLONATE EH | COLONATE EH | COLONATE EH |
| Compatibility with curing agent | Excellent | Excellent | Excellent | Excellent | Excellent |
| Pigment dispersibility | Excellent | Excellent | Excellent | Excellent | Excellent |
| Adhesion | 100 | 100 | 100 | 100 | 100 |
| Bending resistance | 1T | 1T | 2T | 2T | 2T |
| Pencil hardness | 2H | 2H | 2H | 2H | 2H |
| Weatherability | 95 | 85 | 90 | 95 | 95 |
| Initial gloss | 96 | 94 | 93 | 94 | 92 |
| Transparency | Excellent | Excellent | Excellent | Excellent | Excellent |
| Film appearance | ○ | ○ | ○ | ○ | ○ |

| Ex. No. | Ex. 14 | Ex. 15 | Com. Ex. 3 | Com. Ex. 4 |
| --- | --- | --- | --- | --- |
| Curing agent | COLONATE EH | COLONATE EH | COLONATE EH | COLONATE EH |
| Compatibility with curing agent | Excellent | Excellent | Whiten | Excellent |
| Pigment dispersibility | Excellent | Excellent | Bad | Bad |
| Adhesion | 100 | 100 | 100 | 100 |
| Bending resistance | 2T | 2T | 2T | 2T |
| Pencil hardness | 2H | 2H | F | H |
| Weatherability | 85 | 85 | 63 | 40 |
| Initial gloss | 91 | 95 | 81 | 84 |
| Transparency | Excellent | Excellent | Bad | Excellent |
| Film appearance | ○ | ○ | X | Δ |

The fluorine-containing copolymer is excellent in compatibility with curing agent, and can give a coating film having excellent appearance, gloss and weatherability.

In addition to the elements used in the Examples, other elements can be used in the Examples as set forth in the specification and the drawings to obtain substantially the same results.

What we claim is:

1. A fluorine-containing copolymer comprising:
   30 to 85% by mole of structure units having the formula (a):

wherein X and Y are the same or different and each is a hydrogen atom or a fluorine atom, and Z is a hydrogen atom, a fluorine atom, a chlorine atom or a trifluoromethyl group,
   1 to 30% by mole of structure units having the formula (b):

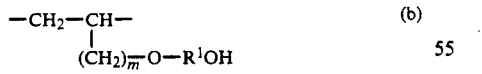

wherein $R^1$ is a linear or branched alkylene group having 1 to 10 carbon atoms and m is 0 or 1,
   3 to 60% by mole of structure units having the formula (c):

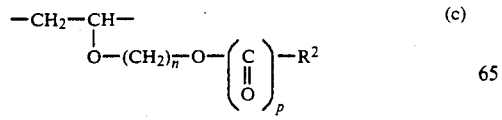

wherein $R^2$ is a linear or branched aliphatic alkyl group having 1 to 10 carbon atoms or an aromatic group, n is an integer of 2 to 8 and p is 0 or 1.

2. The copolymer of claim 1, which further has not more than 50% by mole of structure units of other monomers polymerizable therewith.

3. A curable composition comprising:
   a fluorine-containing copolymer comprising:
   30 to 85% by mole of structure units having the formula (a):

wherein X and Y are the same or different and each is a hydrogen atom or a fluorine atom, and Z is a hydrogen atom, a fluorine atom, a chlorine atom or a trifluoromethyl group,
   1 to 30% by mole of structure units having the formula (b):

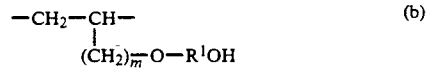

wherein $R^1$ is a linear or branched alkylene group having 1 to 10 carbon atoms and m is 0 or 1,
   3 to 60% by mole of structure units having the formula (c):

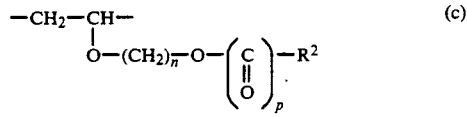

wherein $R^2$ is a linear or branched aliphatic alkyl group having 1 to 10 carbon atoms or an aromatic group, n is an integer of 2 to 8 and p is 0 or 1 as a main component and a curing agent reactive with hydroxyl group of said fluorine-containing copolymer.

* * * * *